United States Patent [19]
Basnett
[11] Patent Number: 4,485,366
[45] Date of Patent: Nov. 27, 1984

[54] MECHANICAL INTERLOCK MECHANISM FOR A VACUUM CONTACTOR

[75] Inventor: Robert T. Basnett, Hendersonville, N.C.
[73] Assignee: Westinghouse Electric Corp., Pittsburgh, Pa.

[21] Appl. No.: 486,588
[22] Filed: Apr. 19, 1983
[51] Int. Cl.$^3$ ........................ H01H 9/20; F16H 21/44
[52] U.S. Cl. .................................... 335/160; 335/151; 200/50 R; 74/96
[58] Field of Search ............... 335/151, 152, 153, 154, 335/132, 160; 200/144 B, 50 C, 50 R; 74/96

[56] References Cited

U.S. PATENT DOCUMENTS 3,367,603 2/1968 Feyerherd .............................. 74/96
3,428,764 2/1969 Drees et al. ............................. 74/96
4,223,289 9/1980 Immel ................................ 335/202

*Primary Examiner*—E. A. Goldberg
*Assistant Examiner*—George Andrews
*Attorney, Agent, or Firm*—John Victor Pezoek

[57] ABSTRACT

A three-arm mechanical interlock for a vacuum contactor having one or more vacuum interrupters. The first two arms of the interlock multiply the angular rotation of a shaft connected to the moveable contacts of the interrupters. Shaft travel of about 4 degrees is increased to about 12 degrees at the end of the second arm of the interlock allowing the interlock pieces to be pressed rather than being machined. After the contactor has been opened, the third arm of the interlock transfers position to block the path of the other arms preventing the accidental closing of the contactor. The contactor may not be reclosed until the third arm is transferred back to its original position. Flat surfaces, preferably parallel, can be provided on the shaft and the bore of the first arm attached thereto to provide a self-aligning connection. An extension member can be fastened to the second arm to provide an additional interlock to another device.

14 Claims, 7 Drawing Figures

10
III
100
410
604
406
402
400
300
204
210
200
500

MECHANICAL INTERLOCK MECHANISM FOR A VACUUM CONTACTOR

CROSS-REFERENCE TO RELATED APPLICATIONS

The material presented herein is related the material presented in the following copending patent applications: Ser. No. 486,584, filed Apr. 19, 1983, entitled "Vacuum Contactor Having DC Electromagnet with Improved Force Watts Ratio;" Ser. No. 486,590, filed Apr. 19, 1983, entitled "Vacuum Contactor Kickout Spring Adjustment Apparatus;" Ser. No. 486,589, filed Apr. 19, 1983, entitled "Contact Overtravel Adjustment Apparatus for a Vacuum Contactor."

BACKGROUND OF THE INVENTION

1. Field of the Invention

In general, the invention relates to vacuum contactors employing vacuum interrupters and in particular to mechanical interlock mechanisms utilized to prevent accidental closing of the vacuum contactor.

2. Description of the Prior Art

There are many designs of vacuum interrupters in existence. U.S. Pat. No. 4,002,867, issued Jan. 11, 1977 entitled "Vacuum Type Circuit Interrupters With a Condensing Shield at a Fixed Potential Relative to the Contact" is a representative example of such vacuum interrupters. An operating mechanism combined with one, two or three vacuum interrupters constitutes a vacuum contactor. In contradistinction to circuit breakers which are considered as principal protective devices during fault conditions in an electrical circuit and are designed for 20,000 to 50,000 operations, the vacuum contactor is used to start and stop various electric loads in response to signals generated by control devices such as push button switches, limit switches, and programmable controllers with the vacuum contactor being designed to have a lifetime of 2 to 3 million operations.

The main difference between vacuum contactors and conventional air break contactors is that the vacuum interrupters of the vacuum contactor break or interrupt the electric current inside a vacuum chamber instead of inside an air arc box. The vacuum chamber for the vacuum interrupter consists of a unit assembly of a sealed evacuated enclosure surrounding a fixed or stationary electrical contact and a moveable electrical contact. A portion of the moveable contact extends through a gas-tight metallic bellows which allows for the essentially linear motion of the moveable contact with respect to the stationary contact. The bellows is attached to the evacuated chamber by means of an end seal. Another end seal is provided for attaching the stationary contact to the enclosure. A ceramic sleeve or cylinder is provided to separate and electrically isolate the two contacts. The end seals are attached to the ends of the ceramic sleeve forming the evacuated chamber of the vacuum interrupter.

Because vacuum interrupters are normally closed by atmospheric pressure and an auxiliary contact spring, means must be provided to force the contacts into the open position which is the normal state for a deenergized contactor. The actual contact force holding the moveable and stationary contacts together inside each vacuum interrupter is the sum of the atmospheric force (atmospheric pressure times the mean area of the bellows) plus the force provided by the auxiliary contact spring and the mechanical spring force exerted by the bellows. This auxiliary contact spring force increases the total force sufficiently to sustain closure of the contacts during high short circuit currents that tend to blow the contacts apart. In the deenergized condition, there is no electrical energy available to provide the force necessary to separate the contacts. Instead, one or more mechanical springs provide this contact opening force. In practice this spring, called the kickout spring, exerts sufficient force to maintain the contacts in the open position in a deenergized contactor. To close the contacts of the vacuum interrupter on command, an electromagnet is provided that when energized, will pull the operating mechanism closed, overcoming the force of the kickout spring and closing the contacts of the vacuum interrupter.

One inherent problem with typical vacuum contactors is the short travel of the vacuum contacts, for example, only 0.150 to 0.200 inches. This small travel is favorable for obtaining a high pulling force from the electromagnet, but mechanical interlocks built to industrial tolerances are difficult to adjust to such small dimensions. The problem cannot be solved by increasing the travel of the moving contacts beyond 0.200 inches because the mechanical life of the metallic bellows decreases rapidly as the amount of contact travel increases.

Because of space considerations in the contactor, the electromagnet used for closing is usually not positioned in line with the axis of travel of the moveable contact. This necessitates the use of operating mechanisms which translate the axis of the force of the electromagnet and kickout spring to that of the moveable contact. This means that the 0.150 to 0.200 inch of linear travel translates to a rotational angle of about 3 to 4 mechanical degrees. Thus, a mechanical interlock must positively detect the difference between the open and closed positions with only a three to four degree differential. It is well established that a rotational travel of 12 to 15 mechanical degrees is adequate for dependable and inexpensive mechanical interlocking.

In order to use the three to four degree differential inherently present with a vacuum interrupter to provide mechanical interlocking, more precise and more expensive mechanical interlock mechanisms are necessary. A mechanical interlock which can sense three to four degrees of mechanical travel is more costly than the type which can sense 12 to 15 degrees of travel because the manufacturing tolerances required with the former mechanism are tighter than those of the latter. This leads to increased production costs because of the necessity of having the smaller tolerances in the different elements of the mechanical interlock mechanism. Therefore, it would be advantageous to have a vacuum contactor which utilizes the less expensive mechanical interlock having the rotational travel of about 12 to 15 mechanical degrees; thus, obviating the need for the more expensive mechanical interlock with a travel of three to four degrees.

SUMMARY OF THE INVENTION

In general, the invention relates to a combination of a vacuum contactor and a mechanical interlock that is used to prevent the accidental closing of the vacuum contactor. The vacuum contactor is one or more vacuum interrupters, each having a stationary contact and a moveable contact, in combination with an operating mechanism which is connected to the moveable contact of each of the interrupters that are present. The operating mechanism opens and closes the vacuum interrupter or interrupters in response to a control signal. Included in the operating mechanism are a spring and an electromagnet which are mechanically linked to the moveable contacts of the vacuum interrupters and are used to provide the forces necessary to open and close, respectively, the contacts of the interrupters. The contacts are enclosed in an evacuated chamber having a substantially gas-tight opening through which a portion of the moveable contact extends. Connected to this extension of the moveable contact is a shaft which rotates about its longitudinal axis through an arc of about 4 degrees as the moveable contact moves between the open and closed positions. A housing is provided for supporting the shaft, the operating mechanism, and the vacuum interrupter or interrupters.

Radially extending from the shaft is a first arm having a roller mounted adjacent the free end thereof. A second arm having a free end and a slotted end is mounted on a pivot located adjacent the free end of the first arm with the slotted end slidably engaging the roller. The pivot is positioned intermediate the ends of the second arm allowing the arcuate motion thereof, the radial distance between the slot and the pivot is less than the radial distance between the shaft and the roller. This increases the length of the arc circumscribed by the free end of the second arm in relation to the length of the arc circumscribed by the free end of the first arm as the operating mechanism moves moveable contact between the open and closed positions.

A third arm, moveable between a first and second position, is provided in the interlock mechanism. An end of the third arm is adjacent the free end of the second arm. When the third arm is at the first position, the first and second arms are free to move allowing the moveable contact to be opened or closed by the kickout spring or electromagnet, respectively. When the moveable contact is in the closed position, the free end of the second arm blocks the path of the end of the third arm; thereby preventing the third arm from moving to the second position. Further, when the moveable contact is in the open position and the third arm is in the second position, the end thereof adjacent the free end of the second arm blocks the arcuate path of the second arm thereby preventing the moveable contact from moving from the open position to the closed position. The first, second and third arms cooperate to prevent the accidental closing of the vacuum interrupter.

By proper orientation of the third arm or the use of other means, such as springs, the third arm can be made to transfer to the second position whenever the moveable contact is in the open position; thus assuring the open state of the contactor. The other end of the third arm provides a mechanical interlock to an additional device whereby the additional device cannot change state until the vacuum contactor is opened. Other combinations of open and closed positions among the devices can be implemented.

The mechanical interlock is used to prevent the simultaneous closing of two or more vacuum contactors or a vacuum contactor and another current interrupting device even through a mistake occurs in the control circuit energizing the closing means of both.

BRIEF DESCRIPTION OF THE DRAWINGS

For a better understanding of the invention, reference may be made to the preferred embodiments exemplary of the invention shown in the accompanying drawings in which.

DESCRIPTION OF THE PREFERRED EMBODIMENTS

Figure 1:
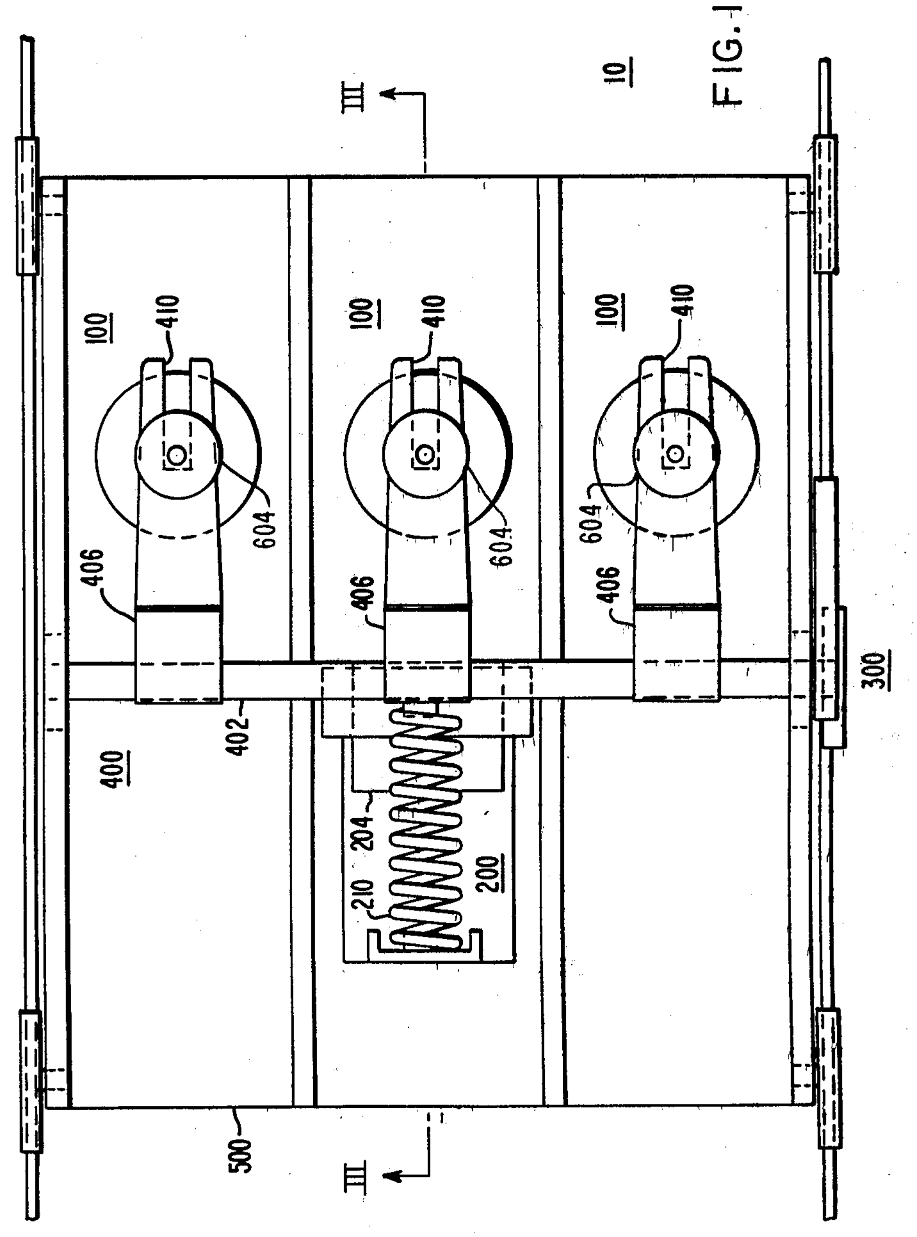
FIG. 1 is a plan view of a vacuum contactor embodying the present invention.

Referring to FIGS. 1 through 4, a vacuum contactor 10 comprising a vacuum interrupter 100, an operating mechanism 200 for the interrupter 100, and a mechanical interlock mechanism 300 is shown. The interrupter 100 includes a stationary contact 102, a moveable contact 104, and an insulating sleeve 105 and two end seals 106*a* and 106*b* forming an evacuated chamber 107 enclosing both contacts. An opening is provided in the chamber 107 through which a portion 108 of the moveable contact 104 extends. The combination of a metallic bellows 110 and the end seal 106*a* provides a gas-tight seal for the opening of the chamber 107 allowing for the linear motion of the moveable contact 104. The stationary contact 102 mounts to the sleeve 105 via the end seal 106*b* and connects to an electrically conductive bus 114 via a fastener such as the bolt 116. A flexible electrically conductive shunt 118 is provided between a second bus bar 120 and the extension 108 of the moveable contact 104 thus completing the other side of the circuit. When the contacts are closed, the electric circuit through the second bus bar 120, shunt 118, moveable contact 104, stationary contact 102, and first bus bar 114 is complete. The insulating sleeve 105, usually made of a ceramic material, is necessary in order to maintain the electrical isolation of the moveable contact 104 from the stationary contact 102 when the vacuum interrupter 100 is deenergized in that the stationary contact 102 is usually connected to the source of electrical potential.

The operating mechanism 200 includes an electromagnet 202 that when energized closes the contacts and a kickout spring 210 that opens the contacts when the electromagnet 202 is deenergized. The electromagnet 202 is a two-piece assembly with a magnetically permeable, U-shaped core 204 and a dual winding assembly 206 having pickup and holding coils (not shown) being disposed about the legs of the core 204. Because of space considerations, the operating mechanism is not axially aligned with the moveable contact 108. Accordingly, a linkage 400 is used between the operating mechanism 200 and the moveable contact 104 to translate the opening and closing forces to the axis of movement of the moveable contact 104. The linkage 400 consists of a shaft 402 that has a radially extending leg 404 and arm 406 and is rotatably supported by means of bearings 408 provided in the housing 500. One arm is provided for each vacuum interrupter in the contactor. The majority of applications require a contactor having 3 poles leading to the use of 3 vacuum interrupters and 3 arms as shown in FIG. 1. However, contactors having other numbers of interrupters can also be constructed.

The leg 404 extends from the shaft 402 adjacent the core 204 of the electromagnet 202, the portion of the leg 404 adjacent the core 204 being magnetically permeable. The arm 406 extends from the shaft 402 to the extension 108 of the moveable contact 104. An opening 410 is provided in the arm 406 to allow the extension 108 to pass therethrough. The size of the opening 410 permits a small degree of misalignment with respect to the contact extension 108. The opening 410 can be either circular or slotted as shown. The slotted opening facilitates removal of the vacuum interrupter 100 when necessary. The portion of the extension 108 projecting beyond the arm 406 is dimensioned such that it is greater than the size of the opening 410. Preferably, however, the extension 108 is threaded allowing a nut 602 to be fastened thereto preventing the withdrawal of the extension 108 from the arm 406. When the contactor is closed, the nut 602 is spaced from the arm 406 forming an overtravel gap g. The nut 602 is locked in this position by the use of a second nut 604 threaded onto the extension 108. A spacing washer 606 can be inserted between the nuts 602 and 604. The overtravel gap g decreases as the contacts 102 and 104 wear. Typically, for a new interrupter this gap is set to be approximately 0.08±0.005 inches. Thus, the nuts 602 and 604 serve to indicate contact wear as well as connecting the interrupter to the linkage 400.

A pivot plate 412 can be provided intermediate the nut 602 and the arm 406 in order to facilitate the opening and closing action of the contactor 100. As can be seen from FIGS. 3 and 4, when the contactor 100 changes from closed to open or from open to closed, the arm 406 rotates through a small arc, contacting the nut 602 and moving the contact 104 to the open position. Although the arm 406 could directly engage the nut 602, lateral forces can be transmitted to the bellows 110 via the corresponding arcuate motion of the moveable contact 104. These lateral forces can reduce the operating life of the bellows 110. The pivot plate 412 and the size of the opening 410 assure that the motion of the moveable contact 108 remains linear even though the arm motion is arcuate thereby substantially reducing the application of any lateral force to the bellows 110.

Figure 3:
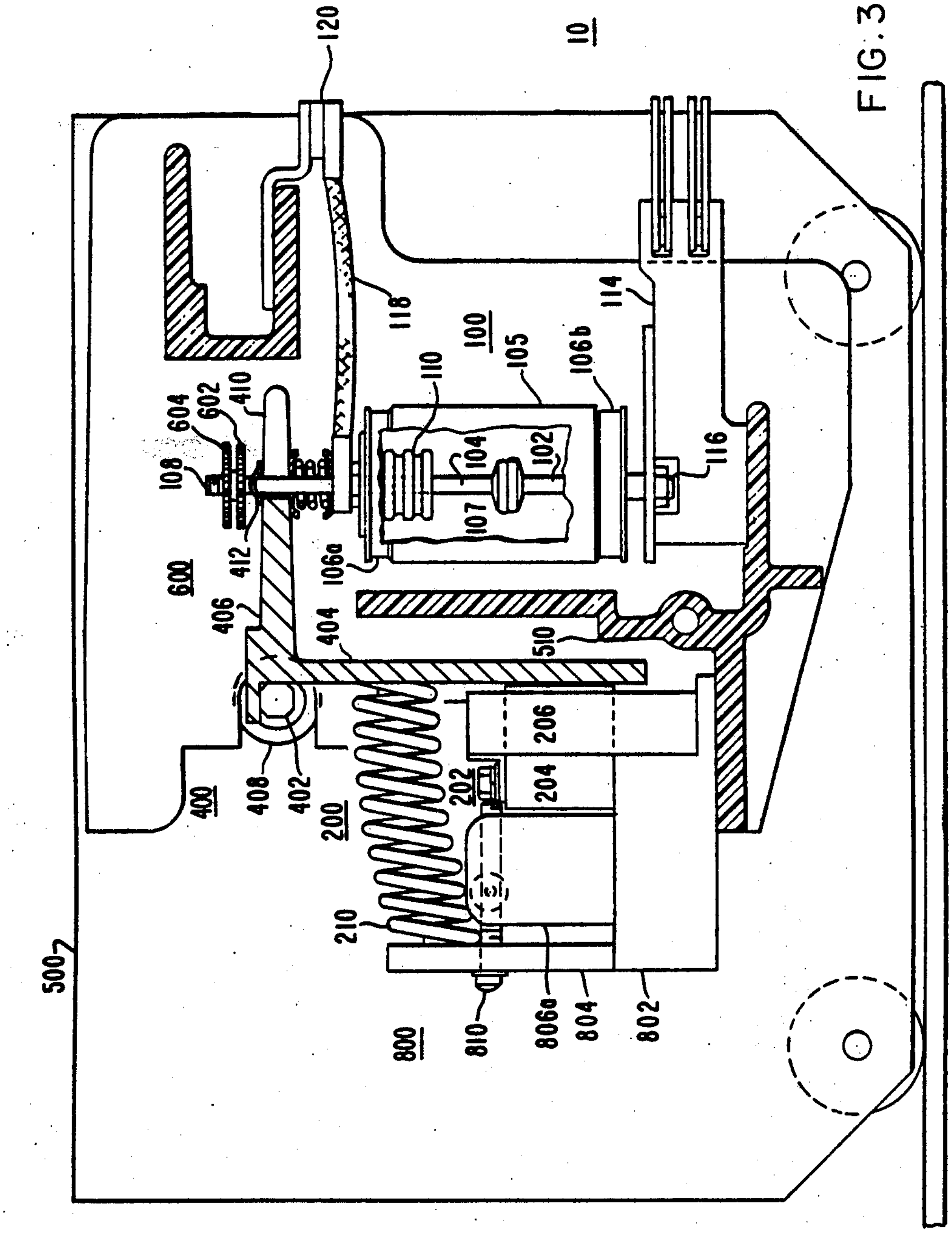
FIG. 3 is a sectional view of the vacuum contactor taken along line III—III of FIG. 1 showing the vacuum contactor in the closed position.
Figure 4:
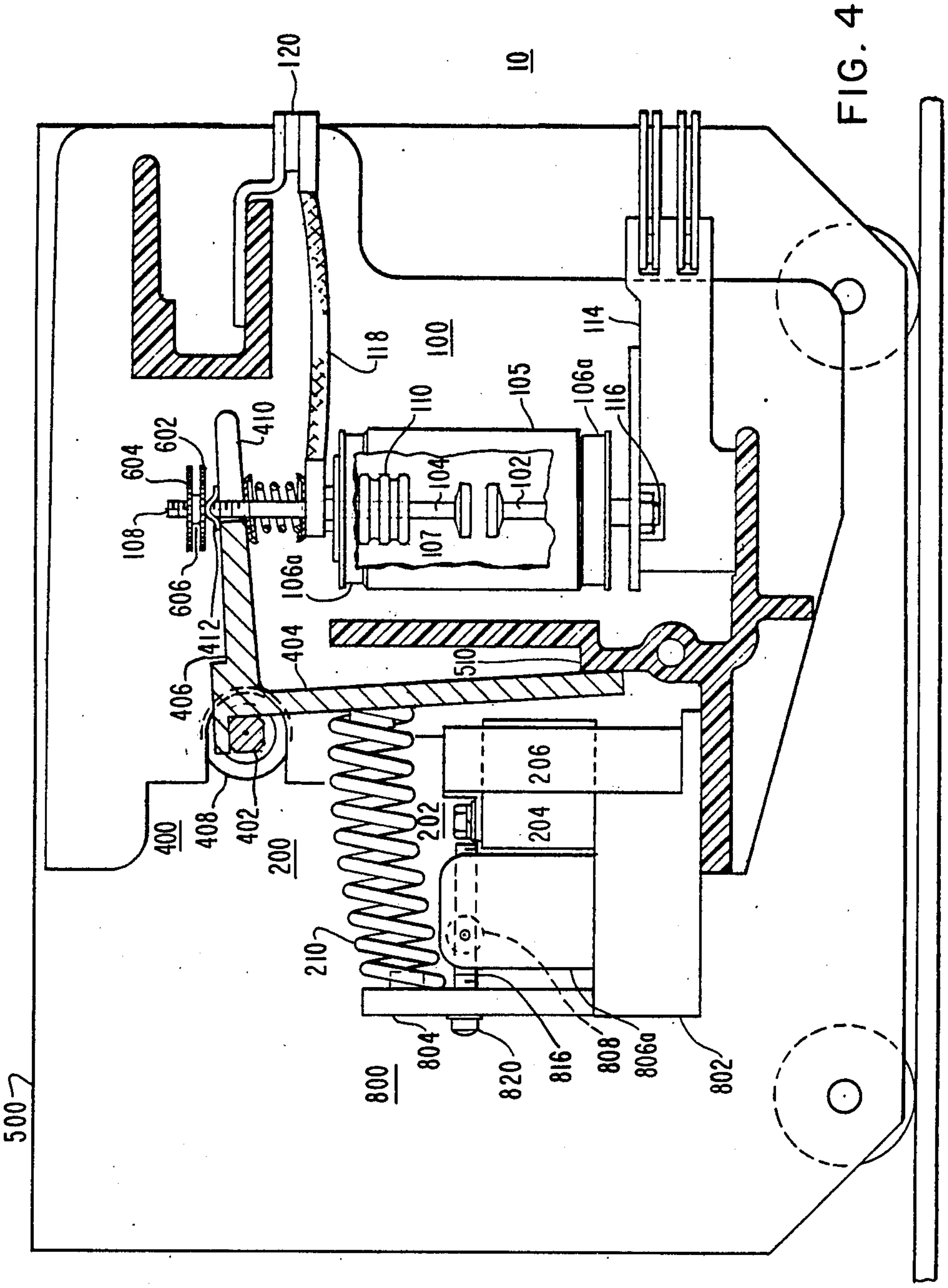
FIG. 4 is a view of the vacuum contactor of FIG. 3 showing the vacuum contactor in the open position.
Figure 6:
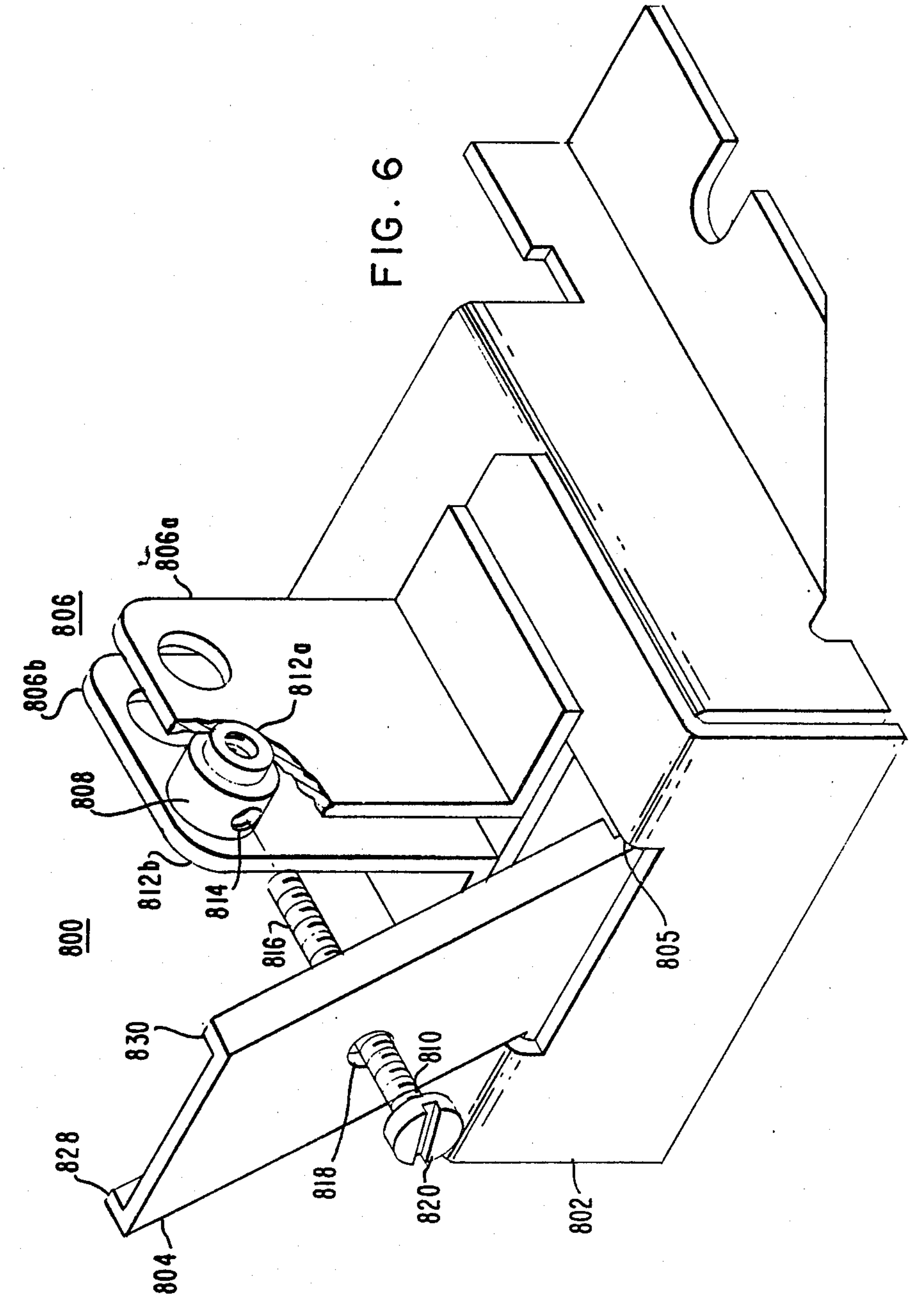
FIG. 6 is an isometric illustration of a spring adjusting mechanism for the vacuum contactor.

Referring to FIGS. 3, 4 and 6, the kickout spring 210 is positioned intermediate the leg 404 and a spring adjusting mechanism 800 including a base 802, a lever 804, a U-shaped bracket 806, a locking block 808, and a rod 810. The lever 804 has one end pivotally mounted to the base 802 with a portion of the lever being in contact with one end of the kickout spring 210. The U-shaped bracket 806 is formed by two L-shaped leg members 806*a* and 806*b* which are secured to the base 802 by fastening means such as self-tapping screws (not shown). Opposed bores 812*a* and 812*b* are provided in the U-shaped bracket 806 for mounting the locking block 808 while allowing for rotation thereof. Bore 814 is provided in the locking block 808 for receiving the shaft 816 of the rod 810. Provided in the lever 804 is a bore 818 corresponding to the bore 814 and through which the shaft 816 of the rod 810 passes. The head 820 of the rod 810 is larger than the opening of the bore 818 in the lever 804, preventing the rod 804 from passing therethrough. A smaller head with a washer can be used to effect the same result. The shaft 816 and the bore 814 can be threaded such that rotation of the rod 810 about the longitudinal axis thereof in one direction causes the lever 804 to increase the force of the kickout spring 210 while rotation of the rod 810 in the opposite direction causes the lever 804 to decrease the force of the kickout spring 210. The length of the kickout spring 210 changes as the force thereof is increased or decreased moving the lever 804 through an arc with respect to the base 802. The bore 818 is dimensioned so that the rod 810 can follow the movement of the lever 804 with the locking block 808 rotating in the opposed bores 812*a* and 812*b* to accommodate the arcuate movement of the rod 810. The spring adjusting mechanism 800 provides for the controllable increase or decrease in the force of the kickout spring 210.

When the electromagnet 202 is energized in response to a control signal generated by a control device such as a push-button switch, the magnetic flux created exerts a pull upon the magnetically permeable portion of the leg 404 drawing the leg 404 into contact with the core 204 of the electromagnet 202, compressing the kickout spring 210, and rotating the leg 404 and shaft 402 through an arc. The arm 406 is also rotated in the same direction allowing the atmospheric force upon the bellows 110 to transfer the moveable contact 104 to the closed position (see FIG. 3). An auxiliary spring 130 can be provided intermediate the arm 406 and the chamber 106 to provide additional closing force. Because the amount of contact travel is in the range of 0.1 to 0.2 inches, the amount of rotation of the leg, shaft, and arm is in the range of 3 to 4 degrees.

When the electromagnet 202 is deenergized, the kickout spring 210 acts upon the leg 404 providing sufficient force to overcome any residual magnetic attraction between the leg 404 and the electromagnet 202 rotating the leg 404 and shaft 402 back to their original positions. This in turn rotates the 406 arm lifting the nut 602; thus, transferring the moveable contact 104 to the open position. The opening 410 in the arm 406 is made such that the moveable contact 104 follows a linear path even though, the leg 404, arm 406, and shaft 402 are rotating through arcs. This prevents lateral stresses generated by the rotation of the linkage 400 from being transmitted to the bellows 110. These lateral stresses can decrease the operating life of the bellows leading to the failure of the interrupter. In addition a stop 510 is provided on the housing 500, preferably adjacent the leg 404, to arrest the motion of the linkage 400 caused by kickout spring 210. This prevents overextension of the bellows 110 as the moveable contact 104 returns to the open position when the contactor is deenergized.

Figure 2:
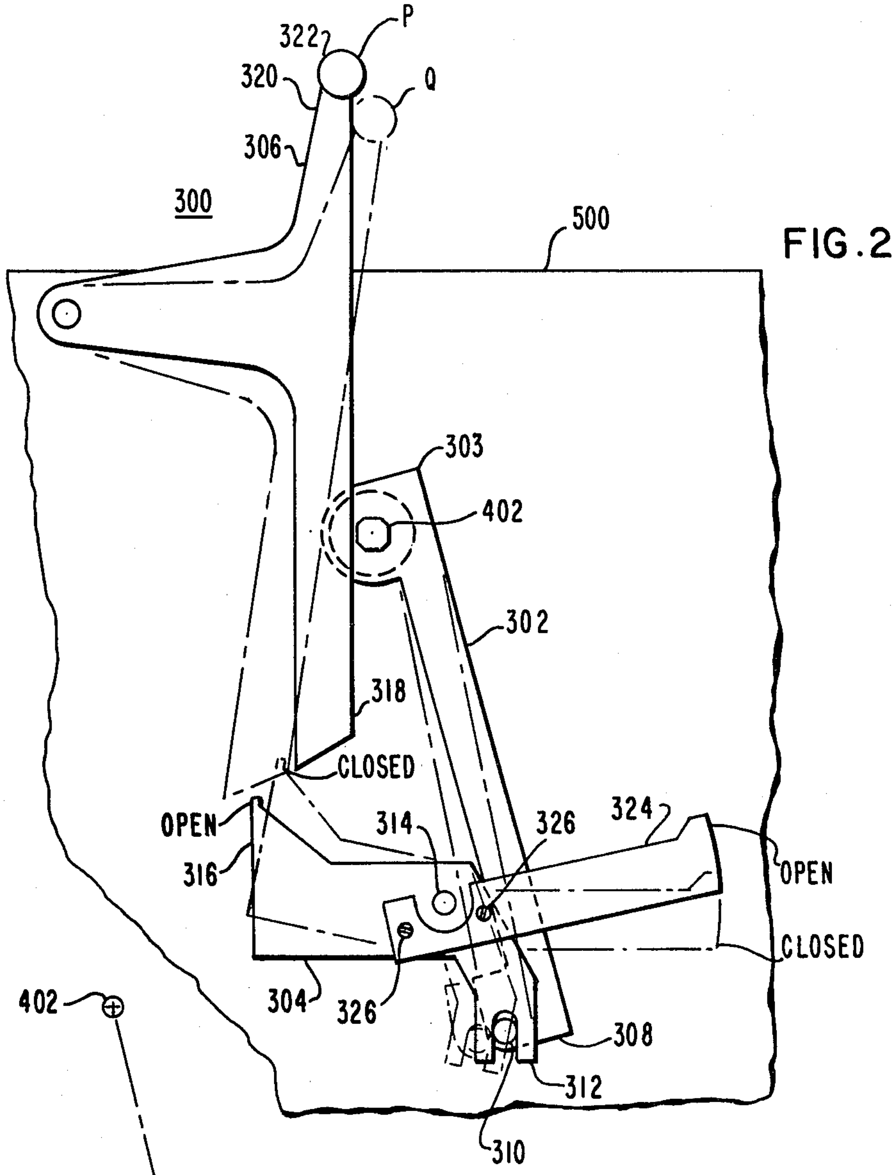
FIG. 2 is a broken away partial side view of the vacuum contactor of FIG. 1 with dashed lines representing alternate positions of the interlock mechanism.

In order to provide positive mechanical interlocking, an interlocking mechanism is provided for the vacuum contactor. Referring to FIGS. 1 and 2, the interlock mechanism 300 includes a first arm 302, a second arm 304, and a third arm 306 cooperating to provide mechanical interlocking capabilities. The first arm 302 extends radially from the shaft 402 and has one end 303 connected thereto; thus moving through the same degree of rotation as the shaft 402. The location of the first arm 302 on the shaft 402 is determined by the arrangement of the various parts of the vacuum interrupter in the housing 500. For the vacuum contactor shown in the figures, the shaft 402 extends through a side wall of the housing 500. The first arm 302 is attached to this exterior extension of the shaft. Where a larger housing is provided, the first arm can be connected to the shaft in the interior of the housing. Adjacent the free end 308 of the first arm 302, a roller wheel or bearing 310 is provided. A second arm 304 having a slotted end 312 is mounted on a pivot 314 such that the slotted end 312 can slidably engage with the roller bearing 310 with the rotation thereof facilitating the movement of the arms 302 and 304.

Figure 5:
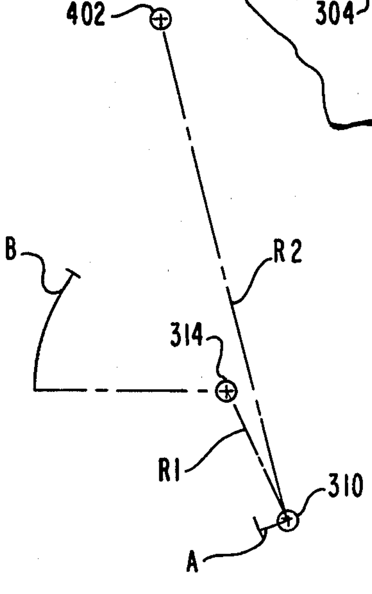
FIG. 5 is a representation of the radii of rotation of the first and second arms of the mechanical interlock showing the angular multiplication in the travel of the free end of the second arm.

Referring to FIG. 5, the radial distance R1 between the pivot 314 and the roller 310 is less than the radial distance R2 between the shaft 402 and the roller bearing 310. The ratio of these two radii determine the multiplication in the degree of travel of the free end 316 of the second arm 304. Thus, as the free end 308 of the first arm 302 moves through the arc A, the free end 316 of the second arm 304 moves through an arc B, whose length is equal to $(R2 \approx R1) \times$ length of arc A. Thus, by making R1 about $\frac{1}{4}$ the magnitude of R2, the length of the arc B is about 4 times the length of arc A. Thus, a motion of 3° can be translated into a motion of about 12°. Typically, the range of motion for the shaft is from about 2 degrees to about 8 degrees with the free end 316 of the second arm 304 having a corresponding range of motion from about 8 degrees to about 24 degrees. Preferably, the shaft 402 rotates between 3 to 4 degrees with the free end 316 of the second arm 304 traveling from about 12 to 16 degrees. The other ranges can be accommodated by moving the pivot point 314 of the second arm.

A third arm 306 is provided on the housing 500 and is moveable between a first position P and a second position Q, indicated by the dashed lines in FIG. 2. One end 318 of the third arm 306 is adjacent the free end 316 of the second arm. When the third arm is at the first position P, the moveable contact can move between the open and closed positions as the movement of the second arm 304 is unimpeded by the third arm 306. When the moveable contact is in the closed position, the positions of the first arm 302 and the second arm 304 are indicated by the dashed lines shown in FIG. 2. Here, the free end 316 of the second arm 304 prevents the third arm 306 from moving to the second position Q. When the moveable contact is in the open position, the third arm 306 can be freely transferred to the second position Q. At this point, it can be seen that when the third arm 306 is in the second position Q indicating that the moveable contact is open, the movement of the free end 316 of the second arm 304 which occurs as the moveable contact moves toward the closed position is prevented by the end 318 of the third arm 306. The third arm 306 is oriented such that when the vacuum interrupter is open, the third arm 306 transfers from the first portion P to the second position Q. Gravity or transfer springs, not shown, may be used to accomplish this transfer of position. Thus, a two-way travel multiplying interlock is achieved. When the vacuum contactor is closed, the third arm 306 is unable to move from the first position P to the second position Q and when the vacuum contactor is open, the contactor is unable to close when the third arm 306 is in the second position Q. The free end 320 of the third arm 306 can be used to provide a mechanical interlock to another contactor or disconnect switch. A roller 322 can be provided on the free end of the third arm in order to facilitate the movement of the third arm with respect to these additional devices.

Figure 7:
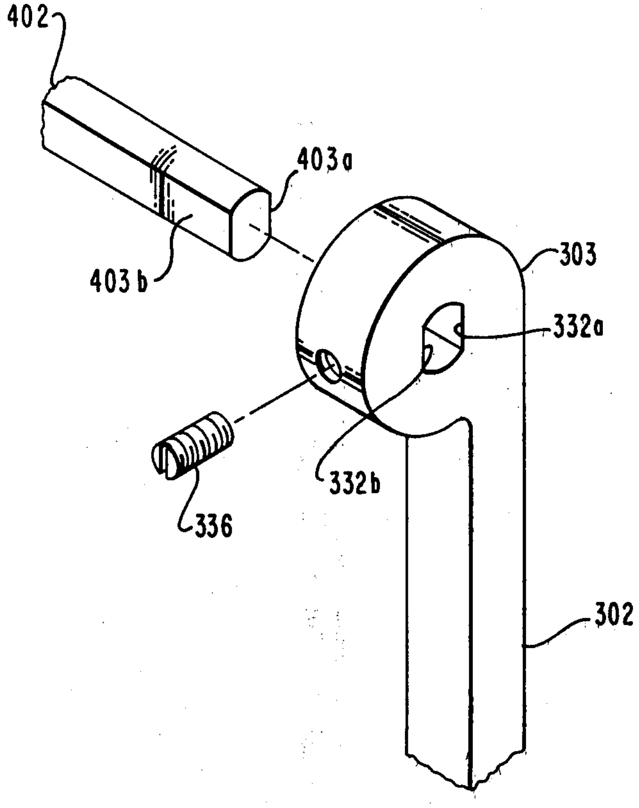
FIG. 7 is an illustration of the connection of the first arm of the mechanical interlock mechanism to the operating mechanism of the vacuum contactor.

Referring now to FIG. 7, an alternate embodiment of the interlock mechanism is provided. The portion of the shaft 402 to which the first arm 302 is attached is provided with two flat surfaces 403*a* and 403*b*, preferably parallel. The end 303 of the first arm which attaches to the shaft 402 has a bore 330 with flat surfaces 332*a* and 332*b* therethrough corresponding to those of the shaft 402 at the point of attachment. These flat surfaces 403*a* and 403*b* and 332*a* and 332*b* on the shaft and in the bore, respectively, are used to ensure the alignment of the first arm 302 with the shaft 402. The bore 330 allows the first arm 302 to be slidably connected onto the shaft 402 so that its removal, if required, may be facilitated. A threaded bore 334 is provided in the end 303 of the first arm 302 to accommodate a screw set 336 that is used to secure the position of the first arm 302 on the shaft 402.

In order to provide an additional mechanical interlock, an extension member 324 may be attached to the second arm 304 as shown in FIG. 2. This extension member 324 is rigidly secured to the second arm 304, preferably using nuts and bolts or self-tapping screws 326 thus allowing for its removal if unwanted. The extension member 324 is used to provide an additional mechanical interlock to other contactors. The movement of the extension member 324 will follow that of the second 304 arm thus also rotating through the multiplied arc of travel.

With both embodiments, it can be seen that effective mechanical interlocking is achieved. Because a greater degree of rotation is achieved with the interlock mechanism of the invention, the use of costly precision machined parts is eliminated. Typically, the arms are pressed rather than machined. The invention as exemplified by the above embodiments, provides an operating mechanism specifically suited for industrial use while exploiting the unique advantages of vacuum contactors. The interlock mechanism is not intended for a particular style or manufacture of vacuum interrupter or contactor, and is acceptable for use with a variety of conventional control devices and pilot devices. The interlock mechanism can be used on vacuum contactors having one or more vacuum interrupters.

I claim:

1. A vacuum contactor, comprising:

a vacuum interrupter including a stationary contact and a moveable contact enclosed in an evacuated chamber with a portion of the moveable contact extending out through the chamber via a gas-tight seal, the moveable contact transferable between an open position and a closed position with respect to the stationary contact;

operating means connected to the extended portion of the moveable contact for effecting relative movement of the moveable contact between the open and closed positions;

a housing for enclosing and supporting the vacuum interrupter and the operating means;

a shaft rotatively supported by the housing and connected to the extended portion to the moveable contact such that the movement thereof between the open and closed positions rotates the shaft through an arc about the longitudinal axis thereof;

a first arm having a free end and radially extending from the shaft;

roller means mounted adjacent the free end of the first arm for providing a rotatable connecting point thereon;

a second arm having a free end and a slot in the other end thereof for slidably engaging and pivoting about the roller means;

pivot means positioned intermediate the free end and the slot of the second arm for allowing the arcuate motion of the second arm, the radial distance between the roller means and the pivot means being less than the radial distance between the shaft and the roller means, thereby increasing the length of an arc circumscribed by the free end of the second arm in relation to the length of an arc circumscribed by the free end of the first arm as the moveable contact transfers between the open and closed positions;

a third arm mounted on the housing and moveable between a first position and a second position with one end thereof adjacent the free end of the second arm, the first arm, second arm, and third arm cooperating in the following manner:

(a) when the third arm is at the first position, the moveable contact can move between the open and closed positions;

(b) when the moveable contact is in the open position and the third arm is in the second position, the end thereof adjacent the free end of the second arm blocks the arcuate path of the second arm, thereby preventing the moveable contact from transferring from the open position to the closed position; and (c) when the moveable contact is in the closed position, the free end of the second arm blocks the path of the end of the third arm preventing the third arm from moving to the second position thereof.

2. The apparatus of claim 1 wherein the third arm is in the second position whenever the moveable contact is in the open position thereby preventing the moveable contact from transferring to the closed position until the third arm is returned to the first position thereof.

3. The apparatus of claim 1 wherein a switch is positioned adjacent the end of the third arm that is opposite the end adjacent the free end of the second arm such that when the third arm moves between the first and second positions the switch changes state.

4. The apparatus of claim 1 wherein an extension member is removably attached to the second arm for providing a mechanical interlock between the apparatus and a second vacuum contactor.

5. The apparatus of claim 1 wherein the shaft has a pair of flat surfaces thereon and the first arm member has a bore therethrough having a pair of corresponding flat surfaces, the flat surfaces of the shaft and the bore cooperating to align the first arm member with respect to the shaft.

6. The apparatus of claim 5 wherein the pair of flat surfaces are substantially parallel.

7. The apparatus of claim 1 wherein the length of the arc circumscribed by the free end of the first arm is in the range from about 2 degrees to about 6 degrees and the length of the arc circumscribed by the free end of the second arm is in a corresponding range from about 8 degrees to about 24 degrees.

8. The apparatus of claim 7 wherein the length of the arc circumscribed by the free end of the first arm is in the range from about 3 degrees to about 4 degrees and the length of the arc circumscribed by the free end of the second arm is in the range from about 12 degrees to about 16 degrees.

9. A mechanical interlock for a vacuum contactor including a vacuum interrupter having a stationary contact and a moveable contact enclosed in an evacuated chamber with a portion of the moveable contact extending out through the chamber via a gas-tight seal, the moveable contact transferable between an open position and a closed position with respect to the stationary contact, a shaft connected outside of the evacuated chamber to the extended portion of the moveable contact such that the movement thereof between the open and closed positions rotates the shaft through an arc about the longitudinal axis thereof, and a housing, comprising:

a first arm having a free end and radially extending from the shaft;

roller means mounted adjacent the free end of the first arm for providing a rotatable connecting point thereon;

a second arm having a free end in a slot in the other end thereof for slidably engaging and pivoting about the roller means;

pivot means positioned intermediate the ends of the second arm for allowing the arcuate motion of the second arm, the radial distance between the roller means and the pivot means being less than the radial distance between the shaft and the roller means thereby increasing the length of an arc circumscribed by the free end of the second arm in relation to the length of an arc circumscribed by the free end of the first arm as the moveable contact transfers between the open and closed positions;

a third arm mounted on the housing and moveable between a first position and a second position with one end thereof adjacent the free end of the second arm, the first arm, second arm and third arm cooperating in the following manner:

(a) when the third arm is at the first position, the moveable contact can move between the open and closed positions;

(b) when the moveable contact is in the open position and the third arm is in the second position, the end thereof adjacent the free end of the second arm blocks the arcuate path of the second arm, thereby preventing the moveable contact from transferring from the open position to the closed position; and (c) when the moveable contact is in the closed position, the free end of the second arm blocks the path of the end of the third arm preventing the third arm from moving to the second position thereof.

10. The apparatus of claim 9 wherein a switch is positioned adjacent the end of the third arm that is opposite the end adjacent the free end of the second arm such that when the third arm moves between the first and second positions the switch changes state.

11. The apparatus of claim 9 wherein an extension member is removably attached to the second arm for providing a mechanical interlock between the apparatus and a second vacuum interrupter.

12. The apparatus of claim 9 wherein the length of the arc circumscribed by the free end of the first arm is in the range from about 2 degrees to about 6 degrees and the length of the arc circumscribed by the free end of the second arm is in a corresponding from about 8 degrees to about 24 degrees.

13. The apparatus of claim 12 wherein the length of the arc circumscribed by the free end of the first arm is in the range from about 3 degrees to about 4 degrees and the length of the arc circumscribed by the free end of the second arm is in the range from about 12 degrees to about 16 degrees.

14. The apparatus of claim 8 wherein the third arm is in the second position whenever the moveable contact is in the open position thereby preventing the moveable contact from transferring to the closed position until the third arm is returned to the first position thereof.

* * * * *

UNITED STATES PATENT AND TRADEMARK OFFICE
CERTIFICATE OF CORRECTION

PATENT NO. : 4,485,366

DATED : November 27, 1984

INVENTOR(S) : Robert T. Basnett

It is certified that error appears in the above—identified patent and that said Letters Patent is hereby corrected as shown below:

On the title page add:

Attorney, Agent or Firm - JOHN VICTOR PEZDEK

Signed and Sealed this

*Eleventh* Day of *June 1985*

[SEAL]

*Attest:*

DONALD J. QUIGG

*Attesting Officer* *Acting Commissioner of Patents and Trademarks*